United States Patent [19]

Hollar, Jr.

[11] 4,169,626
[45] Oct. 2, 1979

[54] RECLINING VEHICLE SEAT

[75] Inventor: Arthur W. Hollar, Jr., Grosse Pointe, Mich.

[73] Assignee: General Motors Corporation, Detroit, Mich.

[21] Appl. No.: 925,215

[22] Filed: Jul. 17, 1978

[51] Int. Cl.² ............................................. A47C 1/026
[52] U.S. Cl. .................................... 297/365; 297/378; 297/379
[58] Field of Search ................ 297/355, 354, 363–371, 297/378, 379

[56] References Cited
U.S. PATENT DOCUMENTS

| 3,580,635 | 5/1971 | Posh | 297/355 |
|---|---|---|---|
| 3,727,978 | 4/1973 | Barriere et al. | 297/379 X |
| 3,879,802 | 4/1975 | Werner | 297/363 X |
| 3,880,464 | 4/1975 | Murphy et al. | 297/379 X |
| 4,103,964 | 8/1978 | Klingelhofer et al. | 297/379 X |

Primary Examiner—Roy D. Frazier
Assistant Examiner—William E. Lyddane
Attorney, Agent, or Firm—Dean L. Ellis

[57] ABSTRACT

Reclining hinge structure for vehicle seat backs foldable forwardly for easy enter and exit and also adjustable to various reclined angular relationships with the seat bottom, such hinge structure particularly including at each side of the seat back first and second hinge parts with a first pivot for forward tilt about the seat bottom and a further pivot defining the reclining axis of adjustment for the seat back. Recliner latch structure is associated between the hinge parts and a latch release blocking member is movable during forward folding of the seat back so that manual release of the latch structure is prevented until the seat back is returned rearwardly. A hooked lever prevents inadvertent forward folding during release of the latch structure.

3 Claims, 8 Drawing Figures

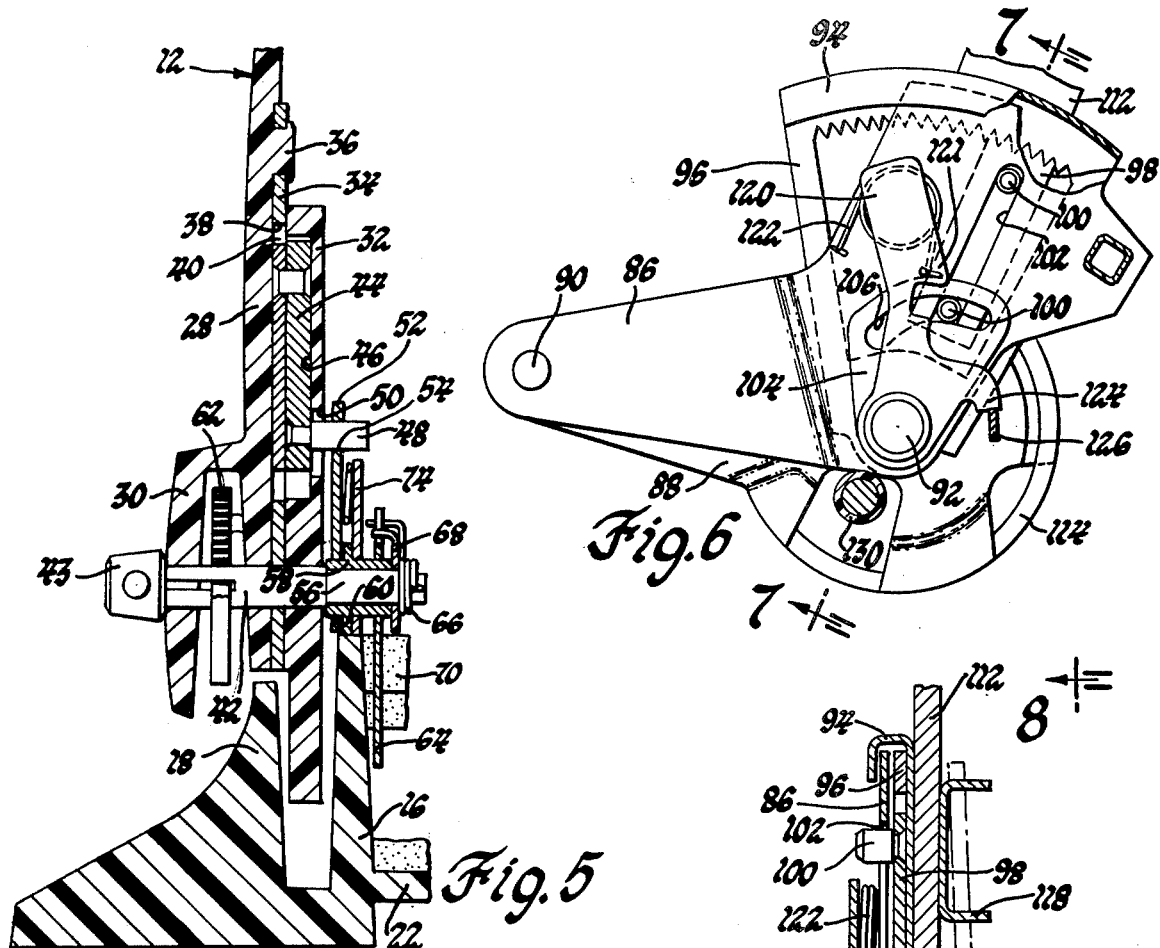
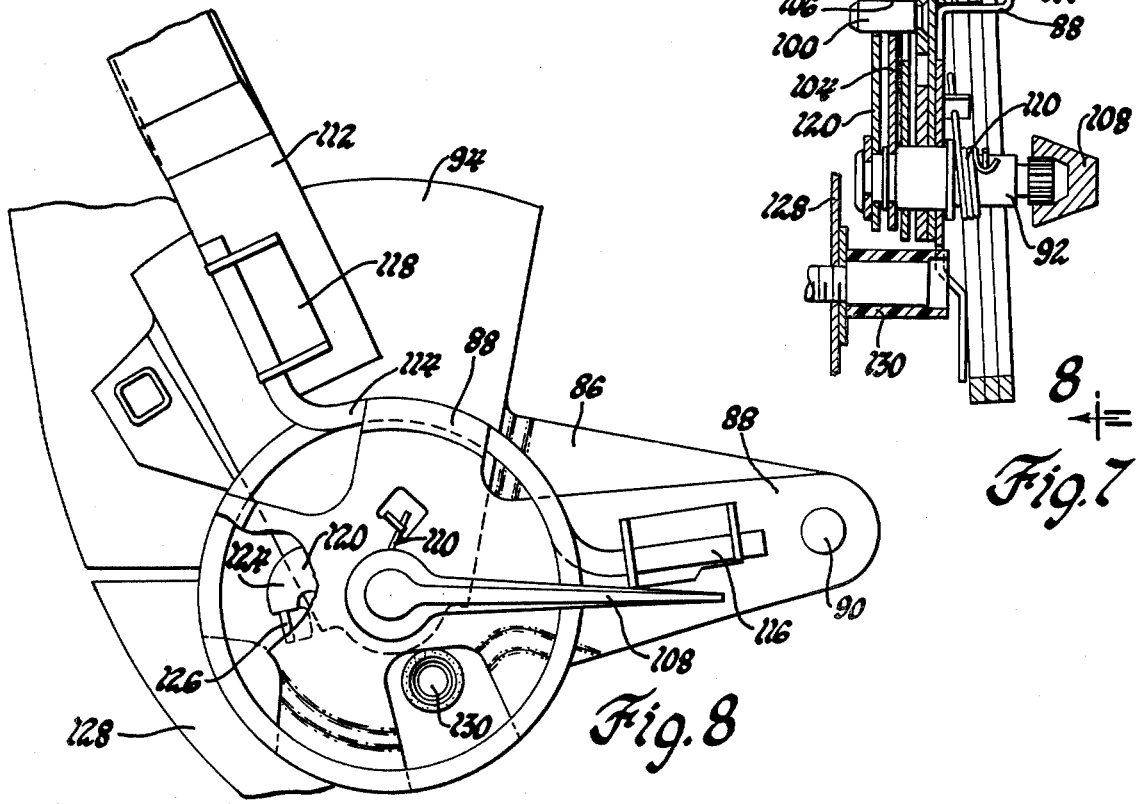

RECLINING VEHICLE SEAT

This invention relates to vehicle seats and more particularly to hinge arrangements for vehicle seats of the type including seat backs foldable for easy enter and exit as well as adjustable in normal seat-forming condition to various reclining positions.

Past hinge structures for forwardly foldable as well as reclinable vehicle seats have generally been of a first type wherein both the forward folding and the reclining adjustment of the seat back occurs about a single hinge axis, and another type wherein the hinge structure is divided into parts having one axis for forward tilt or folding and another axis for reclining adjustment of the seat back. Each has its advantages, but in the case of the single axis type of hinge structure they tend generally to be quite complex, while in the case of the double axis hinge, too many movement modes can inadvertently occur in the seat back at one time.

The present invention has none of these disadvantages, and generally includes at each side of the seat back a pair of hinge parts including a first forward axis for seat back folding, a spaced second axis for reclining adjustment and suitable manually releasable latch structure for holding whatever recliner adjustment has been selected for the seat-forming position of the seat back. However, the two movement modes of the seat back are isolated such that while forward fold for easy enter and exit may freely proceed with this hinge structure, reclining adjustment about the second axis may occur only in the normal seat-forming position of the seat back, means being provided which are responsive to folding of the seat back from such seat-forming position and operative to prevent release of the latch structure while the seat back is out of that position.

These and other objects, features and advantages of the present invention will be readily apparent from the following description and drawings wherein:

FIG. 5 is a view taken generally along the plane indicated by line 5—5 of FIG. 2;

FIG. 6 is a partially broken away side elevational view of another embodiment of recliner hinge for hinge structure according to this invention;

FIG. 7 is an enlarged sectional view taken generally along the plane of line 7—7 of FIG. 6; and FIG. 8 is an elevational view taken in the direction indicated by line 8—8 of FIG. 7.

Figure 1:
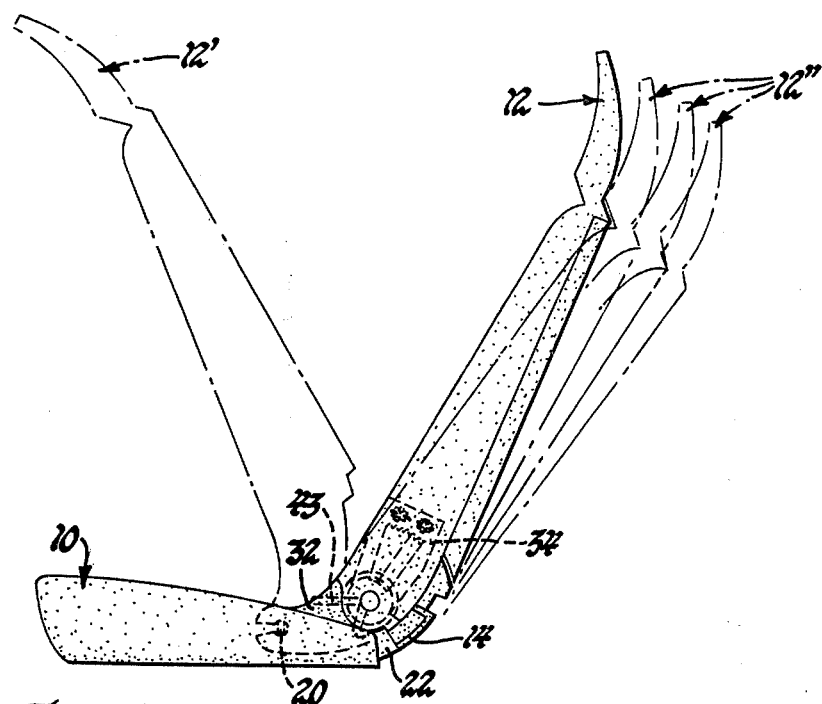
FIG. 1 is a side elevational view of a vehicle seat with reclining hinge structure according to this invention and illustrating in solid and broken lines the positions available in the two movement modes of the seat back.

Referring now particularly to FIG. 1 of the drawings, the vehicle seat includes a seat bottom 10 and a seat back 12 adapted for association in a manner typically required for two-door style vehicle bodies such that the seat back may be tilted or folded forwardly from seat-forming position shown in full lines to a displaced position indicated in broken lines and by the numeral 12'. Furthermore, the seat back is adapted for reclining adjustment of its seat-forming position to any selected one within a range of such positions as indicated by broken lines and by the reference numerals 12".

Figure 2:
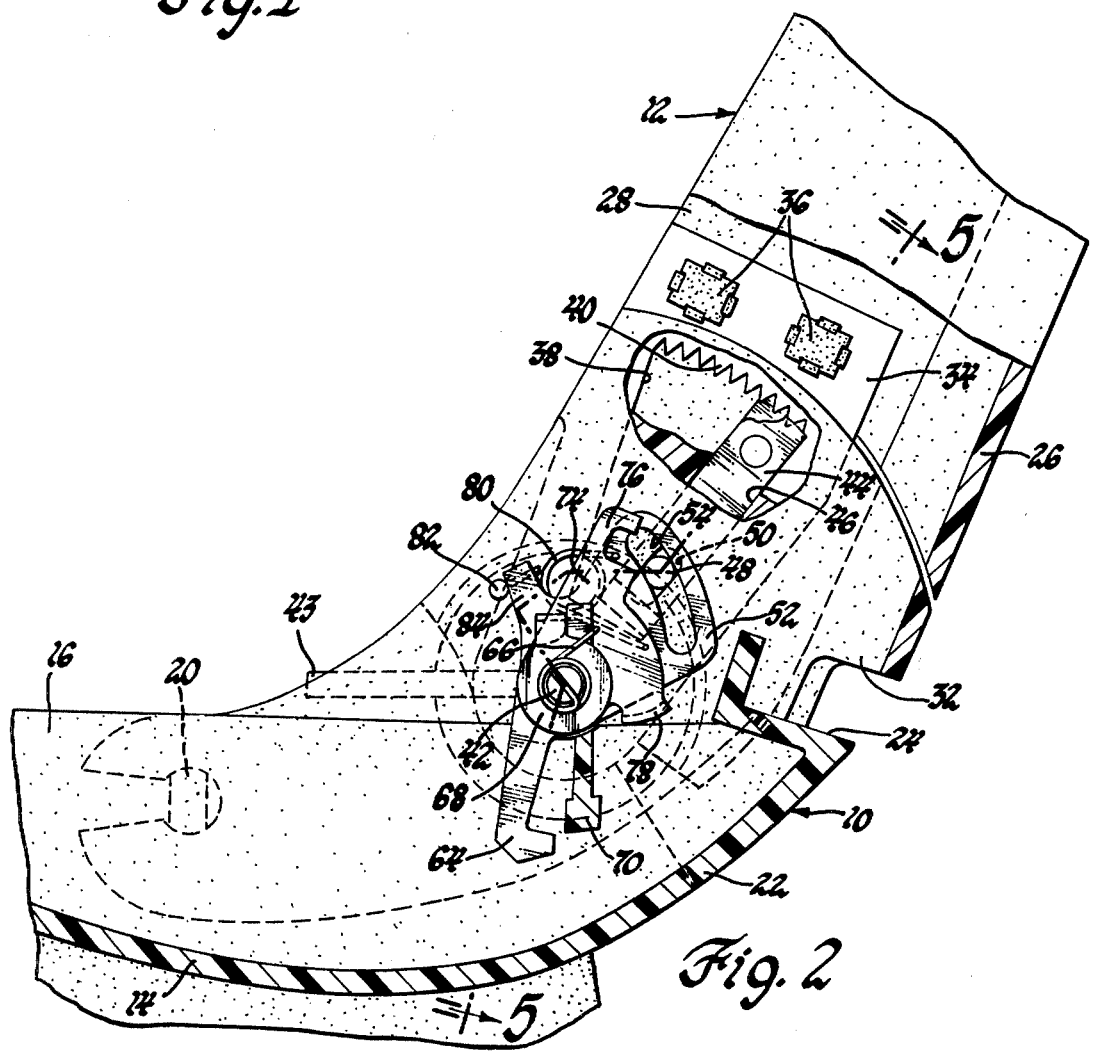
FIG. 2 is an enlarged view of a portion of FIG. 1 partially broken away throughout the seat width to reveal the more distant or inboard recliner hinge assembly of the hinge structure.

Referring to FIGS. 2 and 5, the seat bottom (and seat back) may be of completely conventional construction if desired but is illustrated here as being fabricated of molded plastic construction comprising a seat bottom shell 14 of a rigid structural polymer, such as structural urethane foam, and including suitable floor mounting and attaching structure at either side thereof, not shown, and further a pair of juxtaposed upstanding ribs 16 and 18 defining a hinge channel therebetween. Also, as best indicated in FIG. 2, a double-D sectioned pivot stud 20 formed integrally between the ribs serves as a hinge axis, as will be described. A seat bottom web 22 extending between inboard and outboard sides includes a rear shoulder 24 providing a rest or abutment surface for the normal seat-forming position of the seat back 12. Suitable spring or foam cushioning may be installed within the seat bottom shell 14, as is well known with present conventional constructions.

The seat back 12 may likewise be conventionally constructed but is also here illustrated as being of molded plastic construction including a shell 26 with separate cushioning and having on both inboard and outboard lower side extremities thereof a suitably conformed hinge mounting web 28 styled at its exterior to merge neatly with the surface of rib 18, FIG. 5, and further to include an integral cap 30 for recliner hinge structure.

The recliner hinge structure according to this invention will be described with initial reference to the one hinge assembly portion at the inboard side of seat back 12 and FIG. 2 is accordingly broken away through the majority of the width of the seat back to reveal the same. While more is said on this later, it should be understood that the nearer or outboard hinge assembly, not shown, also generally accords with the oncoming description. The hinge assembly includes a lower hinge part 32, which again may be fabricated of rigid polymeric material such as structural urethane foam. It is disposed within the hinge channel between ribs 16 and 18 and includes a bifurcated end snap-received in known manner over the pivot stud 20. It further includes an inwardly curved shoulder engageable to rest upon shoulder 24, as indicated in FIG. 2, and in so doing defines the normal seat-forming position of the seat back relative to the seat bottom. An upper hinge part 34, best viewed in FIG. 5, is suitably affixed to the inward surface of web 28 of the seat back shell as by heat staking of mounting bosses 36. The upper hinge part has a central large aperture 38 formed with teeth 40 cooperable with a latch bolt, as will appear.

A pivot shaft 42 extends through bearing apertures in the upper and lower hinge parts 32 and 34 to define a reclining hinge axis therefor spaced from the axis of pivot stud 20, and has a handle 43 at its outer end. A latch bolt 44 comprising a riveted pair of laminations has such laminations received respectively within the aperture 38 and a cavity 46 of the lower hinge part for reciprocation radially of pivot shaft 42 to engage or disengage distal end teeth on the latch bolt with teeth 40. Cavity 46 being closely confining in width dimension to bolt 44, FIG. 2, such tooth engagement serves to rigidly hold the upper and lower hinge parts, and accordingly the seat back, in any selected one of various seat-forming positions available thereto within the range of such positions defined by the width of the aperture 38 through teeth 40 as appears in FIG. 2.

For manual release of the latch bolt 44, a stud 48 thereon extends laterally parallel with pivot shaft 42 out of a slot 50 in lower hinge part 32 and into an arcuate slot 54 of a bolt actuating lever 52. The interior end of pivot shaft 42 includes a double-D section portion 56 with a like conformed bearing 58 nonrotatably mounted thereon, and with the bearing 58 including again a double-D shaped outer surface 60 received in a complementary shaped aperture of the actuating lever 52. Thus, counterclockwise rotation of pivot shaft 42 by handle 43 will carry actuating lever 52 in the same direction to cause the slot walls at 54 to translate stud 48, to the limit of slot 50, and withdraw the latch bolt from teeth 40. Seat back 12 may then be adjusted to any of its available seat-forming positions about the axis of the pivot shaft 42, and the pivot shaft then returned counterclockwise to reengage the latch. With the latch engaged, seat back 12 is easily foldable about the axis of stud 20 from whatever seat-forming position has been selected for seat back to the forwardly tilted position 12' indicated in FIG. 1.

Reverting to FIG. 5, a coil torsion spring 62 under cap 30 has its inner turned end received in a slot of the pivot shaft 42 and another outer end, not shown, suitably affixed to the web 28 of the seat back shell. Thus, as viewed in FIG. 2, the spring serves to bias pivot shaft 42 clockwise, (with such bias transferring through actuating lever 52, etc., to be reacted at the bottomed bolt 44) and it also serves to provide a bias in the counterclockwise direction on web 28 of the seat back along with upper hinge part 34. Accordingly, upon rotation of the pivot shaft 42 counterclockwise against spring 62 sufficiently to withdraw latch bolt 44, such spring in the absence of resisting occupant pressure, will force the seat back 12 to assume its forwardmost seat-forming position of FIG. 2.

Figure 4:
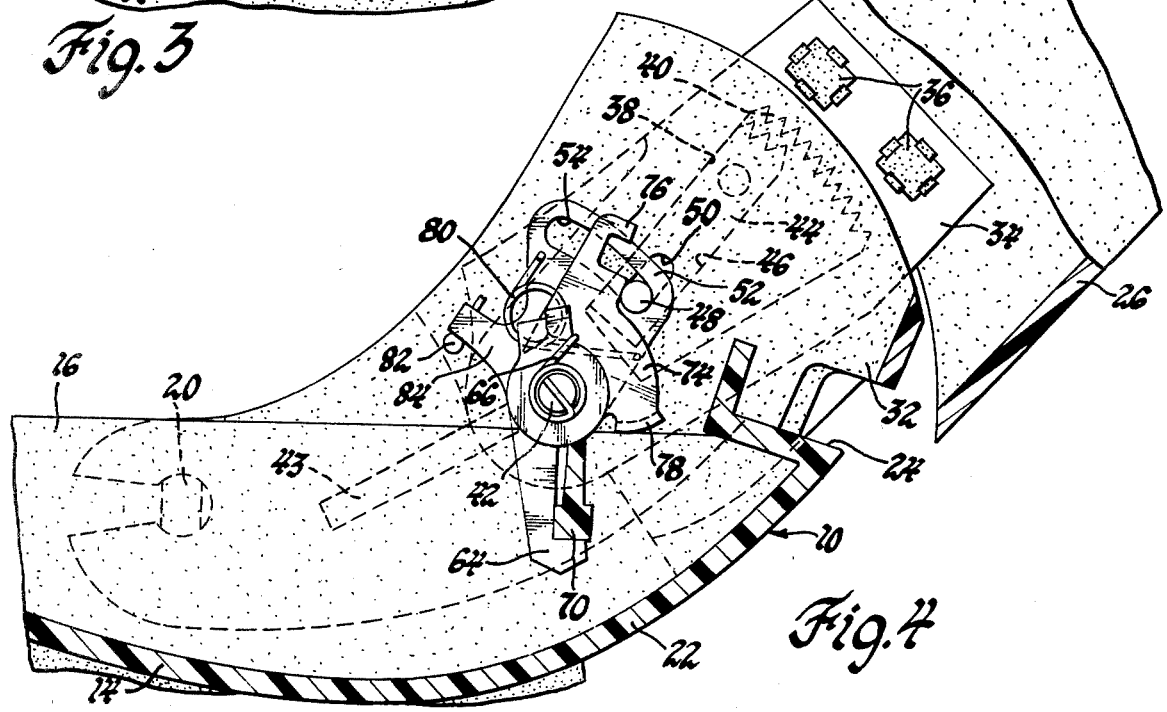
FIG. 4 is a view similar to FIG. 2 but with the seat back shown in a different recliner adjusted seat-forming position.

Referring to FIG. 4, an actuating bolt-withdrawing rotation of pivot shaft 42 is illustrated and with the seat back located in its maximum rearwardly reclined seat-forming position. A hooked-end lever 64 is rotatably disposed on a cylindrical end of pivot shaft 42 and biased counterclockwise by a coil torsion spring 66 hooked thereover and anchored to a slot in such end of the pivot shaft. Normally, a tabbed lever 68 nonrotatably mounted on the double-D shaped portion 56 holds the hooked lever 64 in an inoperative position, as shown in FIG. 2. When the pivot shaft is rotated counterclockwise for latch release, however, a unitary like rotation of tabbed lever 68 allows the spring 66 to carry the hooked lever also counterclockwise to underlie a gusset 70 projecting from rib 16 of the seat bottom shell, as best viewed in FIGS. 4 and 5. Thus, no forward folding of the pivot shaft 42 and seat back 12 can inadvertently occur while the reclining adjustment is being effected, so that the latter movement mode can proceed smoothly and positively without extra operator care. Release of the actuating displacement on pivot stud 42 allows spring 62 to return the same clockwise and causes lever 68 to remove the hooked lever from the gusset at the same time that the latch bolt 44 is reengaged with the upper hinge part teeth 40.

Figure 3:
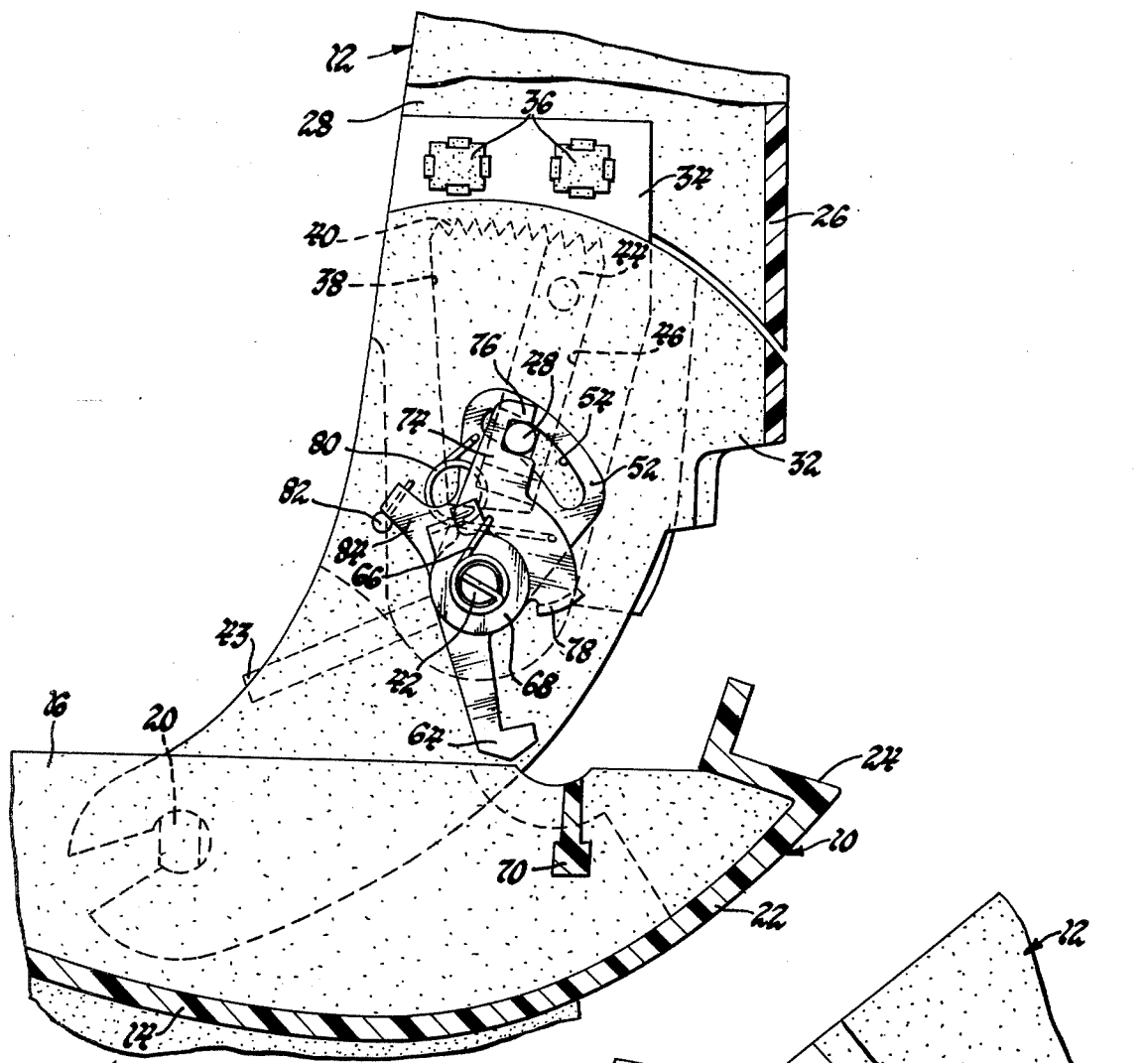
FIG. 3 is a view similar to FIG. 2 with the seat back in a forwardly folded position.

As another principal feature of this invention, a latch release blocking lever 74 is provided and in this case mounted on bearing 58 at a cylindrical portion thereof. It includes a hook 76 engageable with stud 48. It further includes a foot tab 78, best viewed in FIG. 2, engageable with the upper edge of rib 16 when the lower hinge part 32 and pivot shaft 42 are located in seat-forming position. A coil torsion spring 80 is hooked at one end to actuating lever 52 and at its other end to the blocking lever to bias the latter clockwise on its bearing 58 so that, referring to FIG. 3, should the seat back 12 be folded forwardly to its easy enter position withdrawing the foot 78 upwardly, the spring 80 is effective to rotate the lever and place hook 76 over the stud 48, as shown. In such condition, bolt 44 is held and handle 43, pivot shaft 42, actuating lever 52, etc., are blocked against manual rotation counterclockwise in any attempt to adjust the reclined position of the seat back. This second or reclining movement mode is thus prevented during entry or exit and until the seat back is restored to the seat-forming position, such as indicated in FIGS. 2 and 4, wherein foot 78 has reengaged the rib 16 and removed the hook 76 counterclockwise from stud 48.

Latch bolt engagement at both sides of the seat back is usually preferred. The outboard hinge assembly may thus be, in most respects, identical to that just described except that no handle 72 need be provided but only a decorative knob and the blocking lever 74 may be eliminated inasmuch as the single blocking lever will be effective to prevent any manual release as thus arranged. The latch bolt and actuating lever assemblies may be interconnected for conjoint latching or release by means of a push/pull Bowden type sheathed cable assembly. Referring to FIG. 2, such cable assembly may have one end of its core 82 bottomed on an extension 84 of the inboard hinge actuating lever 52, the other end of the core being similarly bottomed on a similar extension of the outboard actuating lever (but on the opposite side of the pivot shaft axis) in such manner that counterclockwise rotation of the former results in a similar counterclockwise rotation of the latter. A counterpart coil torsion spring 62 would also be located on the outboard hinge assembly, and another hooked-end lever 64 may be provided.

Referring now to FIGS. 6 through 8, a modified form of hinge assembly is illustrated and features a configuration suitable for attachment to presently conventional steel-framed seat bottoms and seat backs. It includes a sandwich-type lower hinge part comprised of plates 86 and 88 closely adjoined adjacent a forward tilting axis pivot stud 90 therethrough, and separated at their rearward regions which include a recliner hinge axis pivot shaft 92. An upper hinge plate 94 is located between the two lower hinge plates 86 and 88, received upon shaft 92, and turn-flanged at its upper edge to embrace plate 86. Again, a toothed reinforcement 96 of the upper plate is apertured to define a range of reclining adjustment of the upper hinge plate and seat back relative to a latch bolt 98 reciprocable within the aperture and having studs 100 received closely within a slot 102 of plate 86. An actuating lever 104 with arcuate actuating slot 106 is rotatable by a suitable handle 108 on pivot shaft 92 against the action of a tension spring 110 to move in a clockwise direction, as viewed in FIG. 6, and withdraw the bolt 98 downwardly for release of reclining adjustment of the upper plate 94 and the seat back frame 112, to which such plate is fastened. A large coil spring 114 is held on formed tabs of plate 88, and is anchored at one end on the latter at 116 and at its other end on the seat back frame at 118 in such manner that the seat back frame 112 is urged to a most forward seat-forming position relative to the lower hinge plates 86 and 88.

A blocking lever 120 is again mounted on the pivot shaft 92 and includes a hook 121 engageable with the lower and longer one of the studs 100, FIGS. 6 and 7, to block latch release. Such engagement will occur under the influence of a coil torsion spring 122 biasing the blocking lever clockwise relative to plate 86 when the seat back is folded forwardly from its seat-forming position to remove a foot 124 of the blocking lever from engagement with a stationary tab 126 which may be struck outwardly from the seat bottom frame 128, which is indicated in FIGS. 7 and 8. Return of the seat back reengages foot 124 with tab 126 to return the blocking lever to the condition shown so that latch release may occur. An abutment stud 130 also extends outboard from such seat bottom frame to engage an undersurface of plate 88 to define the seat-forming position of the lower hinge plates and the pivot shaft 92.

It is to be recognized that while two rather specific embodiments here disclosed aim toward compactness and simplicity of structure, other approaches to my contributions may be preferred. As an example, gravity bias on the blocking member can suffice although the positive bias of the disclosure is preferred.

The embodiments of the invention in which an exclusive property or privilege is claimed are defined as follows:

1. In a seat for a vehicle body and of the type including a seat bottom and a seat back adapted for folding and unfolding rotation relative to the seat bottom from and to a seat-forming position therewith and also for selected reclining adjustment within a range of such seat-forming positions, recliner hinge structure comprising, a pair of first hinge parts one at either side of the seat bottom and a pair of second hinge parts each fixed to one side of said seat back, means mounting said first hinge parts on the vehicle body about a first axis and adapting said folding and unfolding rotation of the seat back to occur thereabout, means hingedly interconnecting each said first hinge part with a respective second hinge part for said reclining adjustment of the seat back about a second axis spaced from said first axis, means including biasing means and releasable means operative to hold any selected seat-forming position of said seat back against bias in one direction about said second axis or occupant pressure in the opposite direction until released by manual actuation, and means responsive to forward folding rotation of said seat back about said first axis from the seat-forming position thereof to prevent selected adjustment of the seat-forming position about said second axis by release of the holding means and until said seat back is restored to seat-forming position.

2. In a seat for a vehicle body and of the type including a seat bottom and a seat back adapted for folding and unfolding rotation relative to the seat bottom from and to a seat-forming position therewith and also for selected reclining adjustment within a range of such seat-forming positions, recliner hinge structure comprising, a pair of first hinge parts one at either side of the seat bottom and a pair of second hinge parts each fixed to one side of said seat back, means mounting said first hinge parts on the vehicle body about a first axis and adapting said folding and unfolding rotation of the seat back to occur thereabout, means hingedly interconnecting each said first hinge part with a responsive second hinge part for said reclining adjustment of the seat back about a second axis generally parallel to but spaced from said first axis, means operative to bias the seat back in one direction about said second axis, releasable latch means on at least one first and its respective second hinge parts operative to hold said seat back in a selected seat-forming position, means manually operable to release said latch means, and means interrelated with said seat bottom and said seat back so as to be responsive to rotation of said seat back about said first axis from the seat-forming position thereof to block operation of said manually operable means until said seat back is restored to its seat-forming position.

3. In a seat for a vehicle body and of the type including a seat bottom and a seat back adapted for folding and unfolding rotation relative to the seat bottom from and to a seat-forming position therewith and also for selected reclining adjustment of such seat-forming position, recliner hinge structure comprising, a pair of first hinge parts one at either side of the seat bottom and a pair of second hinge parts each fixed to one side of said seat back, means pivotally mounting each of said first hinge parts on the seat bottom on a first axis defined through one end of each first hinge part for said folding and unfolding rotation of the seat back, pivot means at the opposite end of each first hinge part pivotally interconnecting the same with a respective second hinge part for said reclining adjustment of the seat back about a second axis through such pivot means generally parallel to but spaced from said first axis, means operative to bias the seat back in one direction about said second axis, a releasable latch on each set of first and second hinge parts operative to normally hold a selected seat-forming position of said seat back, manual release means located on one of said pivot means and connected with both of said latches for selective simultaneous release thereof, a blocking lever movably mounted on one of said pivot means and engageable with said seat bottom in any seat-forming position of said seat back so as to be disposed in an inoperative position, means responsive to movement of said seat back from said any seat-forming position to move said blocking lever into a position preventing release of said latches by said manual release means, and means responsive to operation of said manual release means to prevent folding rotation of the seat back from the seat-forming position thereof.

* * * * *

UNITED STATES PATENT AND TRADEMARK OFFICE
CERTIFICATE OF CORRECTION

PATENT NO. : 4,169,626

DATED : October 2, 1979

INVENTOR(S) : Arthur J. Hollar, Jr.

It is certified that error appears in the above-identified patent and that said Letters Patent are hereby corrected as shown below:

Column 6, line 9, "responsive" should read -- respective --.

Signed and Sealed this

Fifteenth Day of January 1980

[SEAL]

Attest:

SIDNEY A. DIAMOND

Attesting Officer

Commissioner of Patents and Trademarks